United States Patent

Hohl

[11] Patent Number: 6,152,420
[45] Date of Patent: Nov. 28, 2000

[54] ELECTROMAGNETICALLY ACTUATED VALVE FOR HYDRAULIC MOTOR VEHICLE BRAKE SYSTEMS

[75] Inventor: Guenther Hohl, Stuttgart, Germany

[73] Assignee: Robert Bosch GmbH, Stuttgart, Germany

[21] Appl. No.: 09/117,936
[22] PCT Filed: Nov. 13, 1996
[86] PCT No.: PCT/DE96/02160
§ 371 Date: Aug. 7, 1998
§ 102(e) Date: Aug. 7, 1998
[87] PCT Pub. No.: WO97/28998
PCT Pub. Date: Aug. 14, 1997

[30] Foreign Application Priority Data

Feb. 7, 1996 [DE] Germany .................. 196 04 316

[51] Int. Cl.⁷ .................................................. F16K 31/06
[52] U.S. Cl. .................................... 251/129.02; 303/119.2
[58] Field of Search ................ 251/129.02, 129.15; 303/119.1, 119.2

[56] References Cited

U.S. PATENT DOCUMENTS 5,673,980 10/1997 Schwarz et al. ............... 251/129.02 X
5,791,628 8/1998 Wolff et al. ....................... 303/119.2 X

*Primary Examiner*—Kevin Lee
*Attorney, Agent, or Firm*—Ronald E. Greigg; Edwin E. Greigg

[57] ABSTRACT

The valve has a seat valve with a hollow-conical valve seat and a closing member in the form of a spherical layer on a longitudinally drilled tappet. An inflow bore communicating with a pressure medium inlet discharges centrally into the valve seat. The largely pressure-equalized tappet is engaged by a magnet armature acting on the seat valve in a closing manner and by a restoring spring acting in the opening direction. The valve embodied in principle as a switching valve is controllable into stable intermediate positions on the basis of the following provisions: the cone angle of the valve seat is at most 90°; the force at the closing member, originating in the restoring spring, is adapted such that it has a course that decreases monotonously with an increasing valve opening stroke (h); the magnet circuit of the valve is embodied such that the magnetic force ($F_M$) exerted on the magnet armature and transmitted to the closing member is variable in infinitely graduated fashion and has a course that decreases monotonously with increasing valve opening stroke (h), the negative slope of which course is less quantitatively than that of the course of spring force.

5 Claims, 2 Drawing Sheets

ELECTROMAGNETICALLY ACTUATED VALVE FOR HYDRAULIC MOTOR VEHICLE BRAKE SYSTEMS

PRIOR ART

The invention is based on an electromagnetically actuated valve for hydraulic motor vehicle brake systems.

In slip-controlled hydraulic brake systems, valves are used which in their electromagnet-actuated closing position are subjected to very strong hydraulic opening forces. The electromagnetic circuit of these valves must therefore, in the valve closing position, bring to bear a holding-closed force on the magnet armature that is greater than the maximum hydraulic opening force plus the force of a restoring spring. A magnetic circuit designed in this way requires corresponding space for installation and with other disadvantages prevents the disposition of such valves in a space-saving, tight package.

German Patent Application DE 31 26 246 A1 discloses a valve of this generic type in which to reduce the holding-closed force by means of pressure equilibrium operative at the tappet, a relatively short pin in the end portion toward the valve dome of the tappet that is passed through the magnet armature and form-lockingly united with it is disposed, such that it is movable for steering purposes, in a longitudinal bore of the tappet. A force originating in the inflow-side pressure on the pin is therefore deviated via the valve dome to the valve housing. This provision allows making the magnet circuit smaller in size. Functionally, the known valve is a 2/2-way valve, which has only two switching positions, in which the full flow cross section of a seat valve is either uncovered or fully blocked. This lessens the mobility of such valves. Moreover, their considerable switching noises are often disadvantageous.

ADVANTAGES OF THE INVENTION

The valve according to the invention has the advantage over the prior art that in a way similar to a proportional valve, it can be transferred, by controlling the magnetic force and with short strokes, to an arbitrary number of intermediate positions but without having to have the complicated design of a proportional valve. This mode of operation can be ascribed to the fact that the restoring spring essentially determines the course of the force engaging the tappet over the valve stroke, while the hydraulic force acting on the closing member has only subordinate influence, because of the diameter ratios of the inflow bore and the sealing diameter of the valve seat and because of the force deviation to the valve dome. A largely continuous flow control is therefore attainable with the valve of the invention. In many applications it can be used instead of proportional valves. In slip-controlled brake systems, the use of the valve of the invention makes it possible to achieve a higher closed-loop control quality and lower noise emissions than in the known valve.

By means of the provisions recited in the dependent claims, advantageous refinements of and improvements to the valve defined by claim 1 are possible.

With the embodiments defined herein a more-defined separation of the stream of pressure medium from the closing member or the valve seat is attained after the valve opens. Unstable flow forces are thus largely avoided.

The refinement of the invention defined has the advantage that a stream of pressure medium once separated from the closing member and the valve seat, in its further course now no longer strikes the tappet. This precludes disruptive influences of flow forces.

With the embodiment of the invention defined hereinafter, it is possible in a simple way to adjust the spring force of the restoring spring, for instance in the closing position of the seat valve, by adjusting the position of the sleeve relative to the tappet.

BRIEF DESCRIPTION OF THE DRAWINGS

One exemplary drawing of the invention is shown in simplified form and described in further detail in the ensuing description.

DESCRIPTION OF THE EXEMPLARY EMBODIMENT

Figure 1:
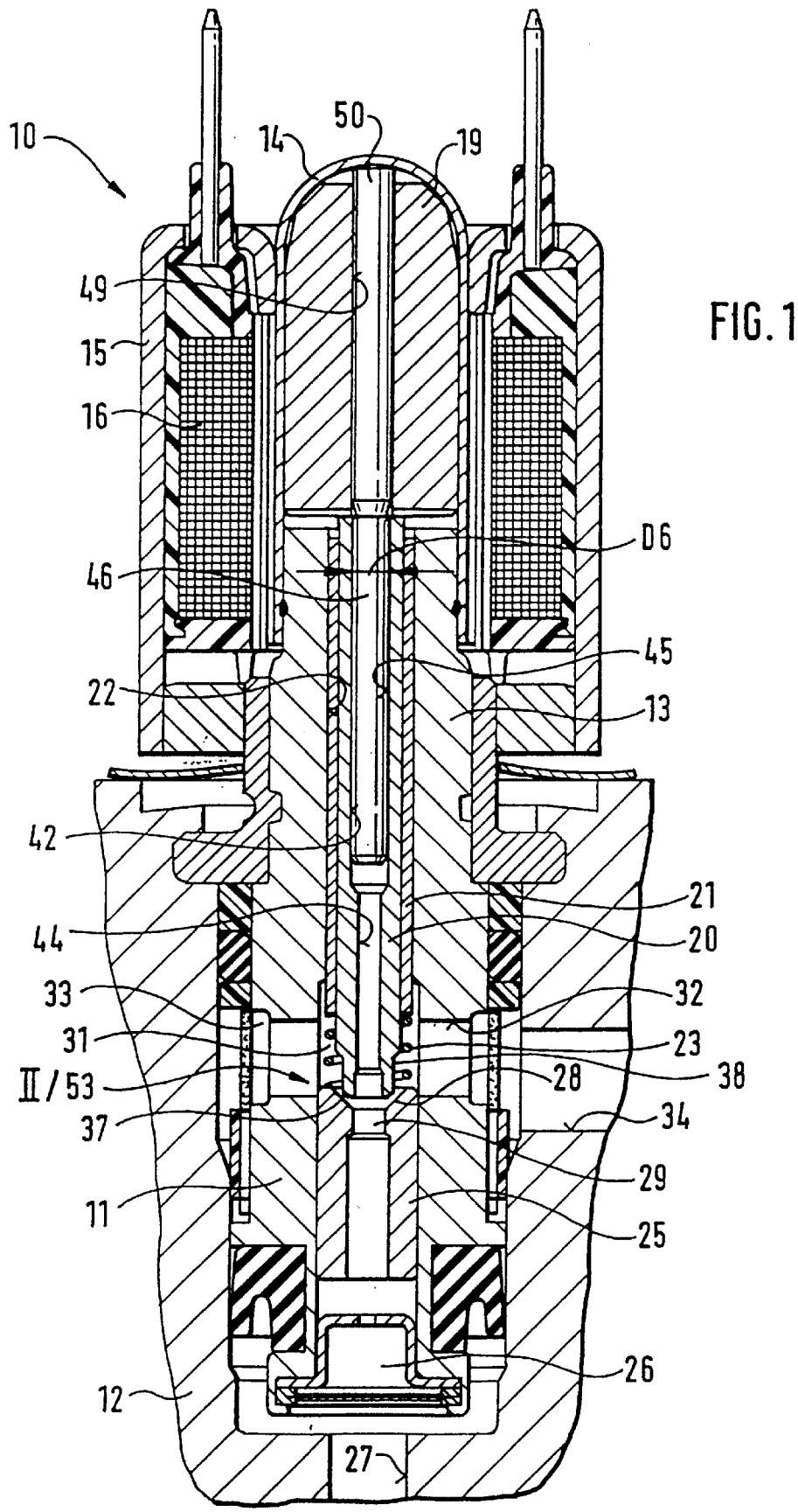
FIG. 1 shows a longitudinal section through an electromagnetically actuated valve with a seat valve.

An electromagnetically actuated valve 10 shown in FIG. 1 of the drawing has a valve housing 11, with which it is received in a valve block 12. Outside the valve block 12, the valve housing 11 is continued in a pole core 13. An annular magnet coil 16, enveloped by a housing 15 that conducts magnetic flux, is slipped onto both the valve dome and the pole core 13.

A longitudinally movable magnet armature 19 is located in the valve dome 14. It engages a tappet 20, onto which a sleeve 21 is press-fitted. The tappet 20 and the sleeve 21 are longitudinally movably received in a longitudinal bore 22 in the pole core 13 and the valve housing 11. A restoring spring 23 engages a face-end support face 24, remote from the armature, of the sleeve 21 (FIG. 2).

The restoring spring 23 is supported on a valve body 25 that is press-fitted into the valve housing 11 and drilled through longitudinally. The valve body communicates with a pressure medium inlet 26 of the valve 10, which in turn communicates with a line bore 27 of the valve block 12.

Figure 2:
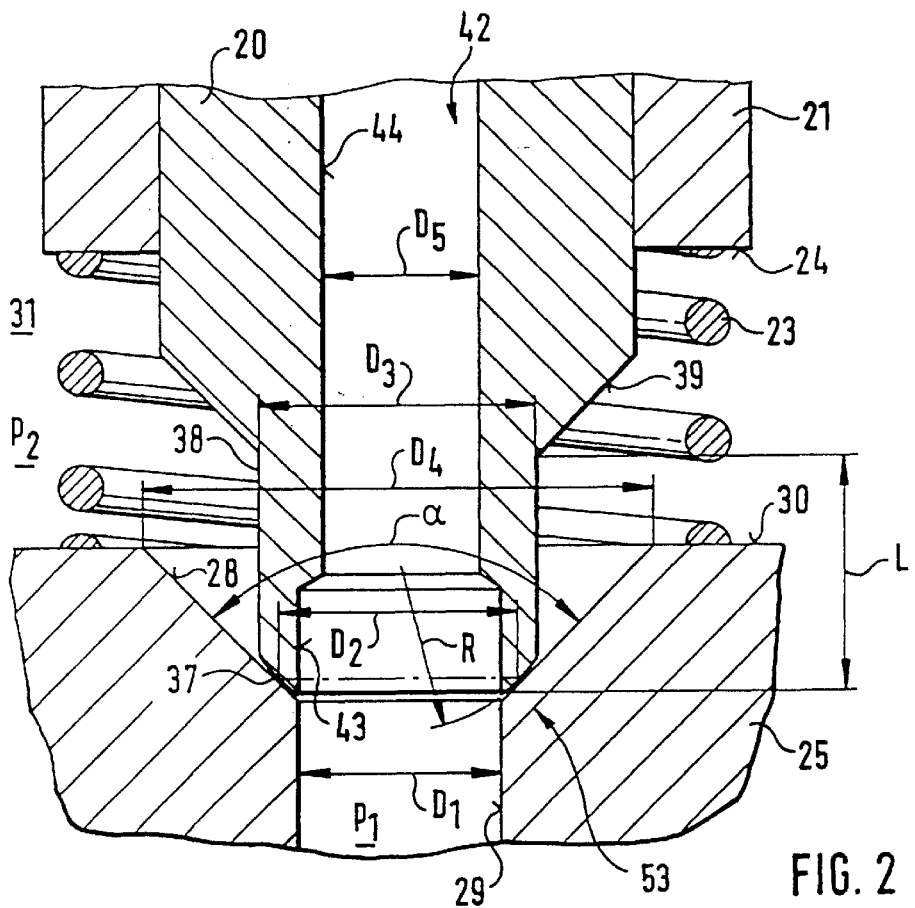
FIG. 2 shows a detail II of FIG. 1 in the form of the seat valve, in the closing position, on a larger scale than in FIG. 1.

The valve body 25, toward the tappet, has a hollow-conical valve seat 28 with a cone angle α of at most 90° (FIG. 2). An inflow bore 29 with the diameter $D_1$ and communicating with the pressure medium inlet 26 discharges centrally into the valve seat 28. The valve seat 28 ends radially outward in a sharp edge at a support face 30, which demarcates the valve body 25 with respect to a valve chamber 31 and extends at right angles to an axis in which the valve body 25, the valve seat 28, the tappet 20 and sleeve 21, and the magnet armature 19 are located.

The valve chamber 31 communicates with a transverse bore 32, which forms the pressure medium outlet 33 of the valve 10 and communicates with a line bore 34 of the valve block 12. The longitudinal bore 22 and the valve dome 14 communicate in a pressure-fluid-carrying way with the valve chamber 31. The magnet armature 19 and the tappet 20 with the sleeve 21 are therefore bathed by a pressure medium.

A closing member 37 in the form of a spherical layer cooperates with the valve seat 28. The closing member 37 is embodied on its face end on a reduced-diameter cylindrical portion 38 of the tappet 20 in the valve chamber 31. The cone angle α of the valve seat 28 and the radius R of the closing member 37 are adapted to one another in such a way that the sealing diameter $D_2$ of the valve seat is equivalent to or slightly larger than the diameter $D_1$ of the inflow bore 29. The diameter D3 of the tappet portion 38, by comparison, is at least approximately equivalent to the sealing diameter $D_2$ of the valve seat 28; that is, the tappet portion 38 is slightly larger than the sealing diameter. The transition of the closing member 37 to the tappet portion 38 is embodied in sharp-edged fashion. The tappet portion 38, including the closing member 37, has an axial length L that is equivalent at least to the sealing diameter $D_2$ of the valve seat 28. The tappet portion 38, after a transitional portion 39 with the valve seat 28 of corresponding conicity, changes over into the tappet 20. It can also be seen in FIG. 2 that the termination of the valve seat 28 in the end face 30 has a diameter $D_4$ that is at least twice the sealing diameter $D_2$ of the valve seat.

In the common axis of the magnet armature 19, tappet 20 and valve body 25, a longitudinal bore 42 that penetrates the tappet over its entire length originates at the closing member 37. Toward the valve body, the longitudinal bore 42 initially has an axially short first bore portion 43, whose diameter is equal to the diameter $D_1$ of the inflow bore 29 of the valve body 25 (FIG. 2). Toward the magnet armature 19, the first bore portion 43 merges with a second portion 44 of the longitudinal bore 42. This second portion has a reduced diameter $D_5$ compared with the first bore portion 43. Following the portion 44, the longitudinal bore 42 is continued in the form of a third bore portion 45, toward the armature, and the diameter $D_6$ (FIG. 1) of this portion is larger than the diameter $D_5$ but smaller than or equal to the diameter $D_1$ of the inflow bore 29. A first pin 46 is longitudinally movably received in the bore portion 45. The pin 46 extends in one direction to near the second bore portion 44 and on the other as far as the magnet armature 19. By means of very close tolerances and a high surface quality of the bore portion 45 in the pin 46, there is only very slight play between the two components. The fit between the pin 46 and the bore portion 45 can therefore be considered as low-leakage and therefore largely pressure-tight. Moreover, the pin 46 is of a material that has a higher coefficient of temperature expansion than the tappet material. In the event of temperature changes, the leakage between the two parts therefore remains largely the same.

The longitudinal bore 42 of the tappet 20 continues in the form of a coaxially extending continuous longitudinal bore 49 of the magnet armature 19. A second pin 50 is received in the longitudinal bore 49. This pin, as shown in FIG. 1, is braced by one end toward the end wall on the valve dome 14. With its other end, the pin 50 engages the pin 46 of the tappet 20 in a force-locking manner. The fit between the second pin 50 and the longitudinal bore 49 of the magnet armature 19 can have greater play than between the first pin 46 and the tappet 20.

In a departure from the exemplary embodiment, the magnet armature 19 and the tappet 20 may also be penetrated by only a single pin.

The valve seat 28 of the valve body 25 and the closing member 37 of the tappet 20 form a seat valve 53, which assumes its open position in the absence of a current through the magnet coil 16, because of the action of the restoring spring 23. When current is applied to it, the valve 10 can be switched into the closing position of the seat valve 53. The electromagnetically actuated valve 10 is thus a switching valve in the form of the 2/2-way valve. It can be used in hydraulic motor vehicle brake systems, of the kind described at length in terms of circuitry and function in the German Patent Reference DE 41 19 662 $A_1$. When used in such a way, the pressure medium inlet 26 of the valve 10 communicates with a master cylinder, as a pressure generator of the brake system, and the pressure medium outlet 33 communicates with a wheel brake, as a pressure consumer.

Conventional switching valves are distinguished from the valve of the invention for instance in that for the seat valve cone angles $\alpha$ greater than 90° are chosen, so that balls of larger diameter can be used as the closing member 37, because such balls are easier to manipulate during mounting on the tappet 20. Moreover, in the conventional seat valve, the goal is to make the transition between the spherical face of the closing member 37 and the tappet 20 free of sharp edges. Finally, in the conventional valve, the magnet circuit is designed such that the magnetic force rises increasingly more steeply at the transition to the closing position.

The valve 10 of the invention is distinguished as follows over the conventional valves:

In the closing position of the seat valve 53, the inflow-side pressure $P_1$ acts on an operative area circumscribed by the sealing diameter $D_2$, which area is composed of a circular-annular face $D_2-D_1$ of the tappet portion 38, this latter area being assigned to the closing member 37, and the end face, toward the valve seat, of the pin 46 in the tappet 20. The force exerted by the pressure $P_1$ on the pin 46 is diverted to the valve dome 14 via the pin 50 of the magnet armature 19. Conversely, the pressure $P_1$ acting on the aforementioned circular-annular face $D_2-D_1$ exerts an opening force on the tappet 20. This force is comparatively slight, because of the small size of the circular-annular face $D_2-D_1$. The downstream pressure $P_2$ prevailing in the valve chamber 31 and in the valve dome 14 acts on a circular-annular face $D_2-D_1$ of the end face toward the armature of the tappet 20 and generates a force acting in a closing direction on the tappet. Since the pressure $P_2$ is lower than the pressure $P_1$, the hydraulic force Fxp resulting from these two forces thus acts in the opening direction on the tappet 20. The prestressed restoring spring 23, embodied as a helical compression spring, also acts in the opening direction on the tappet 20 with a force $F_F$.

When the valve 53 opens from its closing position, the lower pressure level $P_2$ advances to a slight extent in the direction of the inflow bore 29. However, since this bore is virtually equivalent to the sealing diameter $D_2$ of the valve seat 28, and the circular-annular face $D_2-D_1$ has only a slight radial extent, no substantial reduction occurs in the opening force exerted by the pressure $P_1$ on the operative area of the tappet portion 38. On the condition of a constant pressure difference between $P_1$ and $P_2$, the resultant hydraulic force Fxp therefore decreases, over the increasing valve opening stroke H only with a quantitatively slight negative slope, dropping monotonously. Since as explained above the resultant hydraulic force Fxp can also assume only comparatively low values, this has substantial significance for the balance of forces at the tappet 20 of the restoring spring 23. Because the restoring spring 23 has relatively high spring stiffness, the spring force $F_F$ drops, as the valve opening stroke H increases monotonously, with a quantitatively great negative slope. Upon closure of the seat valve 41, the conditions are reversed accordingly.

Figure 3:
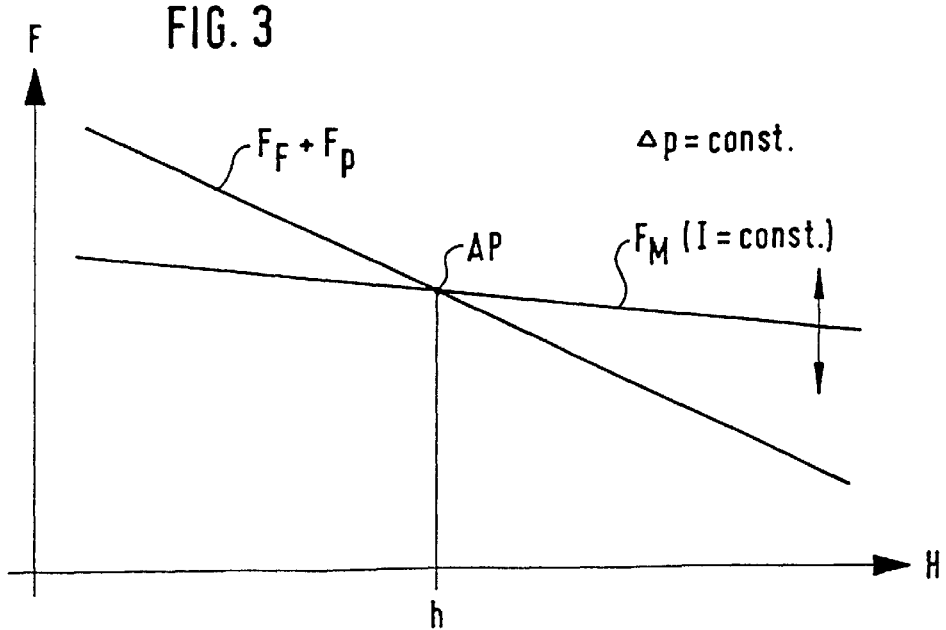
FIG. 3 shows a graph of the forces operative in the seat valve over the valve opening stroke.

The course of the additively linked forces Fxp+$F_F$ over the valve opening stroke H is shown in FIG. 3 in a graph in which the stroke H is assigned to the abscissa and the force F is assigned to the ordinate. The characteristic curve of this total force has a quantitatively relatively major negative slope. Since this depends essentially on the characteristics of the restoring spring 23 and depends less on the change in hydraulic force Fxp over the valve opening stroke H, it is necessary for the function of the valve 10 according to the invention to set the spring force very precisely. This can be done by displacing the sleeve 21 relative to the tappet, while the tappet portion 38 is engaging the valve seat 28, until the magnitude of the spring force required for a zero stroke of the seat valve 41 is reached. Because of the press-fitted connection between the tappet 20 and the sleeve 21, this setting is made permanent.

The shaping of the seat valve 53 assures that the course of the characteristic curve Fxp+$F_F$ given in the graph is largely free of disruptive influences. Thus by means of the relatively small cone angle α of the valve seat 28, an only slight deviation of the streams of pressure medium in the seat valve 53 is attained. As a result, only slight pulsating forces, which occur especially at flow rates, are brought about. The dependency of the valve properties on the differential pressure and on the temperature of the pressure medium is therefore slight. Moreover, because of the sharp-edged transition between the closing member 37 and the tappet portion 38, it is assured that the flow of pressure medium will always separate there, thus leading to uniform flow forces on the closing member 37. Also contributing to a stable flow of pressure medium is the sharp-edged termination of the valve seat 28 at the end face 30 of the valve body 25. The action of the pressure medium flow on the windings of the restoring spring 23 is therefore largely free of disruptive influences. Moreover, the axially recessed transitional portion 39 largely precludes streams of pressure medium from striking the tappet 20.

The aforementioned hydraulic force Fxp and the spring force $F_F$ are directed counter to the magnetic force $F_M$ generated by excitation of the magnet coil 16 and acting in the closing direction of the seat valve 53. The magnetic force $F_M$ must attain at least a magnitude such as to move the seat valve 53 into the closing position, counter to the relatively slight hydraulic force Fxp and by comparison the high spring force $F_F$, and keep it there. As the characteristic curve of the magnetic force $F_M$ in the graph of FIG. 3 shows, it is attained by provisions familiar to the persons skilled in the art in designing the magnetic circuit that for a certain exciter current I=constant, the magnet force $F_M$ likewise assumes a monotonously decreasing course over the valve opening stroke H, yet with a quantitatively lesser negative slope than that of the force course Fxp+$F_F$. The shallow inclination of the characteristic curve $F_M$ is attainable for instance by suitable embodiment of the magnetic circuit, especially if in the closing position of the valve 10 a relatively large remanent air gap between the magnet armature 19 and the pole core 13 remains, or if the magnet armature and the pole core are embodied as a plunging stage. The magnetic force characteristic curve shown is representative for a certain exciter current I=constant. Characteristic curves that are shifted in the direction of the ordinate can be generated by means of other exciter currents instead. Modified exciter currents can be established by means of current control, pulse-width modulation, and other known methods.

The two characteristic curves, Fxp+$F_F$ on the one hand and $F_M$ on the other, intersect in the graph at a point where there is an equilibrium between the opening hydraulic force Fxp and the spring force $F_F$ on the one hand and the closing magnetic force $F_M$ on the other. This point is designated as the operating point AP, at which the seat valve 53 at the stroke h, assumes a stable position. If the characteristic magnetic force is shifted, by current control, in the direction of the double arrow in the graph, the operating point is along a different valve opening stroke. Therefore, despite its structural design as a switching valve, the valve 10 of the invention can be controlled, similarly to a proportional valve, in an infinitely graduated manner as a function of current with a variable opening stroke. This controllability exists at least for short valve opening strokes.

The valve 10 of the invention can be used in hydraulic motor vehicle brake systems, for instance for brake slip or drive slip control or in brake systems with a hydraulic servo pressure source for direct feeding of brake pressure into wheel brake cylinders. With the valve 10, an infinitely graduated regulation of pressure and volumetric flow is advantageously possible, if the brake system is equipped with suitable sensors and closed-loop control electronics. The valve 10 can also be used as a pressure limiting valve, by adjusting the response pressure, by means of current control, to either constant or applications-dependent variable values.

The foregoing relates to a preferred exemplary embodiment of the invention, it being understood that other variants and embodiments thereof are possible within the spirit and scope of the invention, the latter being defined by the appended claims.

What is claimed is:

1. An electromagnetically actuated valve (10) for hydraulic brake systems of a motor vehicle, comprising the following characteristics:

a seat valve (53) provided between a pressure fluid inlet (26) and a pressure fluid outlet (33);

the seat valve (53) has a closing member (37) and a hollow-conical valve seat (28), into which an inflow bore (29), communicating with the pressure fluid inlet (26), discharges centrally with a diameter ($D_1$) corresponding substantially to a sealing diameter ($D_2$) of the valve seat;

the closing member (37) is provided with a sharp-edged transition to the face end of a tappet (20);

the tappet (20) is engaged by a magnet armature (19) acting closingly on the seat valve (53) and at least indirectly by a restoring spring (23) acting in an opening direction;

a closing force ($F_F$) at the closing member (37), originating in the restoring spring (23), is adapted such that the closing force has a course that decreases monotonously with an increasing valve opening stroke (h);

a magnet circuit of the valve (10) is formed such that a magnetic force ($F_M$) exerted on the magnet armature (19) and transmitted to the closing member (37) is variable in infinitely graduated fashion and has a course that decreases monotonously with an increasing valve opening stroke (h), the magnet armature (19) is disposed in a valve dome (14) that communicates a pressure medium with the pressure outlet (33);

the tappet (20) has a longitudinal bore (42), which begins at the closing member (37) and in which a longitudinally movable pin (46) supported at least indirectly on a wall of the valve dome (14) is received, a cross section of the pin corresponding at least approximately to a cross section of the inflow bore (29), a cone angle (α) of the valve seat (28) is at most 90°;

the closing member (37) has the form of a spherical layer; and the course of the magnetic force ($F_M$) over the valve opening stroke (h) has a negative slope, which is quantitatively less than that of the course of the spring force.

2. The valve of claim 1, in which the closing member (37) is included on a tappet portion (38) whose diameter $(D_3)$ is approximately equivalent to the sealing diameter $(D_2)$ of the valve seat (28).

3. The valve of claim 1, characterized in that the valve seat (28) terminates freely with a diameter $(D_4)$ that is at least twice the sealing diameter $(D_2)$ of the valve seat.

4. The valve of claim 2, characterized in that the tappet portion (38), after a length (L) corresponding to at least the sealing diameter (D2) of the valve seat (28), ends at a transitional portion (39) whose conicity corresponds to that of the valve seat.

5. The valve of claim 1, in which the tappet (20) has a sleeve (21) press-fitted onto the tappet (20) that has a support face (24) for the restoring spring (23).

* * * * *